(12) United States Patent
Naney et al.

(10) Patent No.: US 11,719,904 B2
(45) Date of Patent: Aug. 8, 2023

(54) OPTICAL ARRANGEMENT FOR SMALL SIZE WIDE ANGLE AUTO FOCUS IMAGING LENS FOR HIGH RESOLUTION SENSORS

(71) Applicant: ZEBRA TECHNOLOGIES CORPORATION, Lincolnshire, IL (US)

(72) Inventors: Alexander J. Naney, Kings Park, NY (US); Igor Vinogradov, Oakdale, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 246 days.

(21) Appl. No.: 16/887,256

(22) Filed: May 29, 2020

(65) Prior Publication Data
US 2021/0373274 A1    Dec. 2, 2021

(51) Int. Cl.
G02B 7/02     (2021.01)
G02B 7/09     (2021.01)

(52) U.S. Cl.
CPC ............. *G02B 7/021* (2013.01); *G02B 7/026* (2013.01); *G02B 7/09* (2013.01)

(58) Field of Classification Search
CPC .......... G02B 7/02; G02B 7/021; G02B 7/023; G02B 7/026; G02B 7/022; G02B 3/14; H04N 5/225; H04N 5/2253; H04N 5/2257; H04N 5/23287; H04N 5/2254
See application file for complete search history.

(56) References Cited

U.S. PATENT DOCUMENTS

| 2008/0151396 A1* | 6/2008 | Chiang | G02B 7/021 359/823 |
| 2009/0302116 A1* | 12/2009 | Tan | G06K 7/10831 235/462.35 |
| 2009/0310224 A1* | 12/2009 | Yu | G02B 3/14 359/666 |
| 2011/0013297 A1* | 1/2011 | Barnes | G03B 3/00 359/823 |
| 2011/0091199 A1* | 4/2011 | Lee | G03B 17/00 396/533 |

(Continued)

FOREIGN PATENT DOCUMENTS

CN    201281769 Y       7/2009
CN    206321852 U   *   7/2017
(Continued)

*Primary Examiner* — Ephrem Z Mebrahtu

(57) ABSTRACT

Optical arrangements for small size wide angle auto focus imaging lens for high resolution sensors are disclosed herein. An example optical assembly includes a first lens holder, a second lens holder, a first lens group, a biasing element, and a variable focus optical element. The first lens holder includes a collar having an internal flange forming a spring seat and the first lens group is disposed within the first lens holder. The second lens holder includes a collar defining a chamber and is coupled to the collar of the first lens holder. The variable focus optical element is disposed within the chamber of the second lens holder and the biasing element is disposed within the chamber of the second lens holder between the spring seat and the variable focus optical element and configured to apply a threshold force to the variable focus optical element.

22 Claims, 4 Drawing Sheets

(56) References Cited

U.S. PATENT DOCUMENTS

| | | | |
|---|---|---|---|
| 2011/0096425 A1* | 4/2011 | Lee | G02B 7/026 |
| | | | 359/829 |
| 2014/0111682 A1* | 4/2014 | Flugge | G03B 17/02 |
| | | | 29/446 |
| 2014/0340771 A1* | 11/2014 | Wakabayashi | G02B 7/028 |
| | | | 359/820 |
| 2019/0179132 A1* | 6/2019 | Kang | G02B 3/14 |
| 2019/0219742 A1 | 7/2019 | Park et al. | |

FOREIGN PATENT DOCUMENTS

| KR | 20050098127 A | 10/2005 |
|---|---|---|
| KR | 20060068611 A | 6/2006 |

* cited by examiner

OPTICAL ARRANGEMENT FOR SMALL SIZE WIDE ANGLE AUTO FOCUS IMAGING LENS FOR HIGH RESOLUTION SENSORS

BACKGROUND

Scanning devices may capture images with a wide angle field of view (FOV) to effectively decode information in an image for use in machine vision applications. Additionally, the demand for portable sensors is increasing, which requires the use of smaller sensors that require active alignment of the sensors. Accordingly, portable scanning devices must be capable of functioning with a wide field of view while generating sharp images over a working range for the purposes of machine vision.

As such, there is a need for improved systems, methods, and devices which address these issues.

SUMMARY

In an embodiment, the present invention is an optical assembly for imaging an object of interest, the optical assembly comprising: a first lens holder including a collar having an internal flange forming a spring seat; a first lens group disposed within the first lens holder along an optical axis and configured to receive light from an object of interest; a second lens holder comprising a collar defining a chamber and coupled to the collar of the first lens holder; a biasing element disposed within the chamber of the second lens holder; and a variable focus optical element disposed within the chamber of the second lens holder along the optical axis and configured to receive the light from the first lens group. The biasing element is disposed between the spring seat and the variable focus optical element and configured to apply a threshold force to the variable focus optical element.

In a variation of this embodiment, the first lens holder comprises a stop that is engaged by an end of the collar of the second lens holder to define a relative position between the first lens holder and the second lens holder.

In a variation of this embodiment, the engagement between the stop and the end of the collar of the second lens holder defines a distance between the first lens group and the variable focus optical element.

In a variation of this embodiment, the optical assembly further comprises a flexible cable that wraps around the variable focus optical element and the collar of the second lens holder defines a slot that receives the cable.

In a variation of this embodiment, the optical assembly further comprises an aperture positioned between the variable focus optical element and the second lens group.

In another embodiment, the present invention is an optical assembly for imaging an object of interest, the optical assembly comprising: a first lens holder having internal threads; a first lens group disposed within the first lens holder along an optical axis and configured to receive light from an object of interest; a second lens holder having external threads that threadably engage the threads of the first lens holder; a variable focus optical element disposed within the second lens holder along the optical axis and configured to receive the light from the first lens group; and a biasing element disposed within the second lens holder and configured to apply a threshold force to the variable focus optical element.

In a variation of this embodiment, the optical assembly further comprises a spacer disposed within the second lens holder and positioned between the variable focus optical element and the biasing element. The spacer may have an inner surface that outwardly tapers toward the variable focus optical element to define an engagement surface at an end of the spacer.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
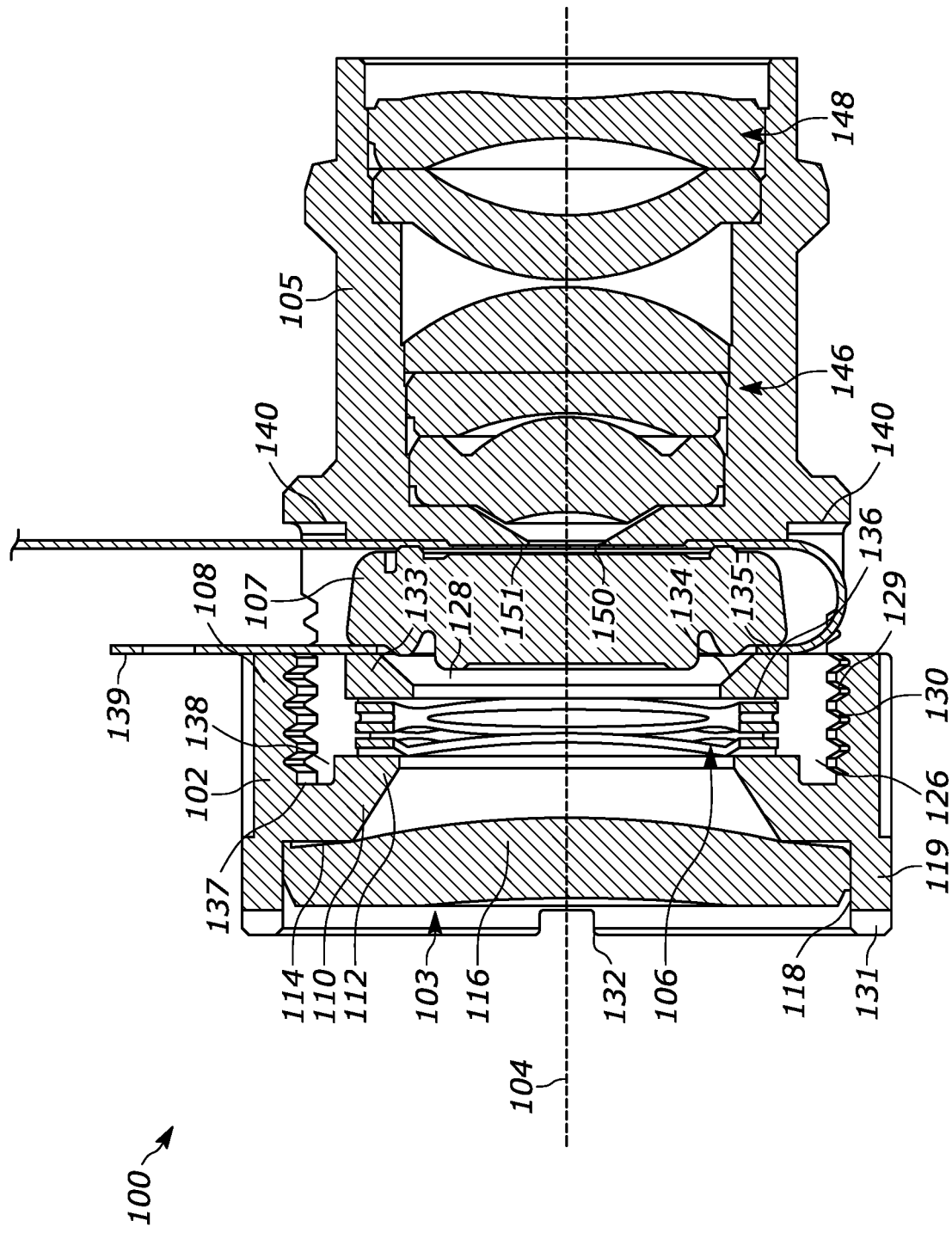
FIG. 1 illustrates a cross-sectional view of an optical assembly for imaging an object of interest in accordance with a disclosed example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates a cross-sectional view of an optical assembly 100 for imaging an object of interest in accordance with a disclosed example. The optical assembly 100 may be used to obtain image data that may be decoded to identify, for example, barcodes and/or a target/object of interest within the image.

In the example shown, the optical assembly 100 includes a first lens holder 102 and a first lens group 103 disposed within the first lens holder 102 along an optical axis 104. The optical assembly 100 also includes a second lens holder 105, a biasing element 106, and a variable focus optical element 107 disposed within the second lens holder 105 along the optical axis 104 and configured to receive the light from the first lens group 103. Generally, the lens holders 102, 105 are coupled together in a manner that aligns the first lens group 103 and the optical element 107 and also compresses the biasing element 106, causing the biasing element 106 to apply a threshold force to the optical element 107. Thus, the optical assembly 100 both retains the optical element 107 and holds the first lens group 103. Moreover, the first lens holder 102 is configured to control centration and tilt of the first lens group 103 relative to other lens groups (e.g., the second lens group) of the optical assembly 100 and further discussed below.

Referring initially to the first lens holder 102, the first lens holder 102 includes a collar 108 having an internal flange 110 that forms a spring seat 112 and a lens seat 114 that opposes the spring seat 112. The first lens group 103, which is shown as a single lens 116, rests against the lens seat 114 and is disposed within a forward chamber 118 of a second collar 119 of the first lens holder 102 opposite the collar 108. The first lens group 103 may be configured to receive light from an object of interest (not shown) and to correct for overall imaging lens distortion. The first lens group 103 may also partially balance the field of curvature of optical radiation. While the first lens group 103 is illustrated as the single lens 116, the first lens group 103 may include any number of lenses.

Similarly, the second lens holder 105 includes a collar 126 defining a chamber 128 and that is coupled to the collar 108 of the first lens holder 102. The collar 108 of the first lens holder 102 has threads 129 that threadably engage threads 130 (see, FIG. 2) of the collar 126 of the second lens holder 105. To facilitate rotating the first lens holder 102 relative to the second lens holder 105, an end 131 of the second collar 119 may define a pair of opposing slots 132 (see, FIG. 2) that are configured to receive a tool (e.g., a screwdriver).

While the threads 129 of the first lens holder 102 are internal threads and the threads 130 of the second lens holder 105 are external threads, the threads 129 of the first lens holder 102 may be external threads and the threads 129 of the second lens holder 105 may be internal threads or the lens holders 102, 105 may be coupled together in different ways. For example, the lens holders 102, 105 may be coupled using a snap-fit connection(s), a crush rib(s), and/or another type of fastener to maintain positive pressure between the lens holders 102, 105 and/or on the optical element 107.

In the example shown, the biasing element 106 and the optical element 107 are disposed within the chamber 128 of the second lens holder 105. The biasing element 106 is disposed between the spring seat 112 and the optical element 107 and is configured to apply a threshold force to the optical element 107 of between about 7 Newton (N) and 12 N. Having the biasing element 106 apply the threshold force to the optical element 107 maintains reliable contact between the optical element 107 and corresponding electrodes, holds the optical element 107 in a relatively fixed position to deter shock events, and/or avoids over-compressing the optical element 107. Put another way, the biasing element 106 may apply a force to the variable optical element 107 that prevents the optical element 107 from moving within the second lens holder 105, deters the optical element 107 from being damaged, encourages proper operation of the optical element 107, and/or substantially ensures electrical contact between the optical element 107 and the corresponding electrodes. In some examples, the biasing element 106 is a wave spring and the optical element 107 is at least one of a liquid lens and a tunable lens. However, other types of biasing elements and/or variable focus optical elements may prove suitable. For example, the biasing element 106 may be a coil spring, a Belleville spring, a curved spring, a finger spring, etc.

In the example shown, a spacer 133 is disposed within the second lens holder 105 between the optical element 107 and the biasing element 106. The spacer 133 has an inner surface 134 that outwardly tapers toward the optical element 107 to define an engagement surface 135 at an end of the spacer 133. As a result, the spacer 133 has a spring-seat surface 136 that is relatively wide against which the biasing element 106 sits and the thinner engagement surface 135 focuses the threshold force on to the optical element 107. Moreover, providing the thinner engagement surface 135 allows a central portion of the optical element 107 to not be subjected to the force of the biasing element 106.

To define a relative position between the first lens holder 102 and the second lens holder 105, the first lens holder 102 includes a stop 137 that is defined by the internal flange 110 and the collar 108. In the example shown, an engagement between the stop 137 and the end 138 of the collar 126 defines a distance between the spring seat 112 and the optical element 107 and positions the spring seat 112 to compress the biasing element 106 a threshold distance. As a result, when the collar 126 bottoms out on the stop 137, a threshold distance between the first lens group 103 and the optical element 107 is achieved and the spring seat 112 is consistently positioned to compress the biasing element 106 and allow the biasing element 106 to apply the threshold force to the optical element 107.

In the example shown, a flexible cable 139 wraps around the optical element 107 and is used to provide electrical power to the optical element 107, via electrodes, and to control the focal distance of the optical assembly 100. The collar 126 of the second lens holder 105 defines a pair of opposing slots 140 (see, FIG. 2) that receives the cable 139. The end 138 of the collar 126 defines an opening 142 (see, FIG. 2) for each of the slots 140 that allow the cable 139 to be received within the slots 140 and wrapped around the optical element 107.

The optical assembly 100 may also include a second lens group 146 and/or a third lens group 148 that are disposed within the second lens holder 105, along the optical axis 104, and configured to receive the light from the optical element 107. The second lens group 146 may be a Cooke triplet and may be configured to correct for pupil aberrations of the imaging lens due to the aperture and the third lens group 148 may be configured to correct for lens field curvature. In the example shown, the second lens holder 105 defines an aperture 150 positioned between the optical element 107 and the second lens group 146. The optical element 107 rests against or adjacent to a surface 151 of the second lens holder 105 that defines the aperture 150. In another example, the aperture 150 may be a separate structure disposed within the second lens holder 105 and positioned between the optical element 107 and the second lens group 146.

While the first lens group 103 includes a single lens, the second lens group 146 includes a plurality of lenses, and the third lens group 148 includes a plurality of lenses, any one of the lens groups 103, 146, and/or 148 may include any number of lenses (e.g., 1, 2, 3, etc.) and/or one or more of the lens groups 103, 146, and/or 148 may be omitted. Moreover, additional or different lens groups may be included as desired.

Figure 2:
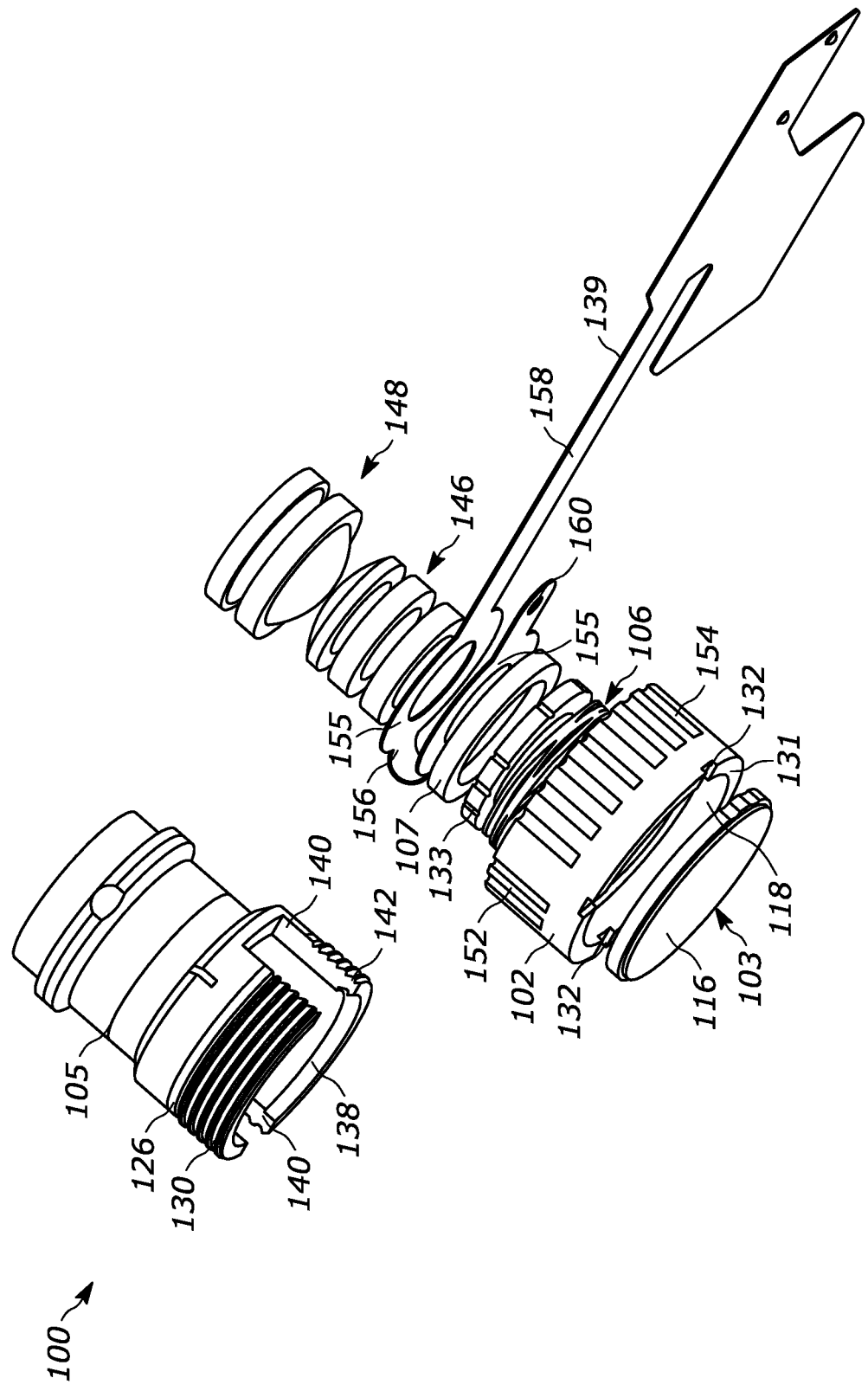
FIG. 2 illustrates an expanded isometric view of the optical assembly of FIG. 1.

FIG. 2 illustrates an expanded isometric view of the optical assembly 100 of FIG. 1. In the example shown, the first lens holder 102 has an exterior surface 152 that defines grooves 154 that facilitate an individual (or a tool) gripping the first lens holder 102 while threading the lens holders 102, 105 together. FIG. 2 also shows that the slots 140 are rectangular and that the cable 139 has a pair of spaced apart annular portions 155 that allow light to pass therethrough and that are coupled by a bend 156 of the cable 139.

Figure 3:
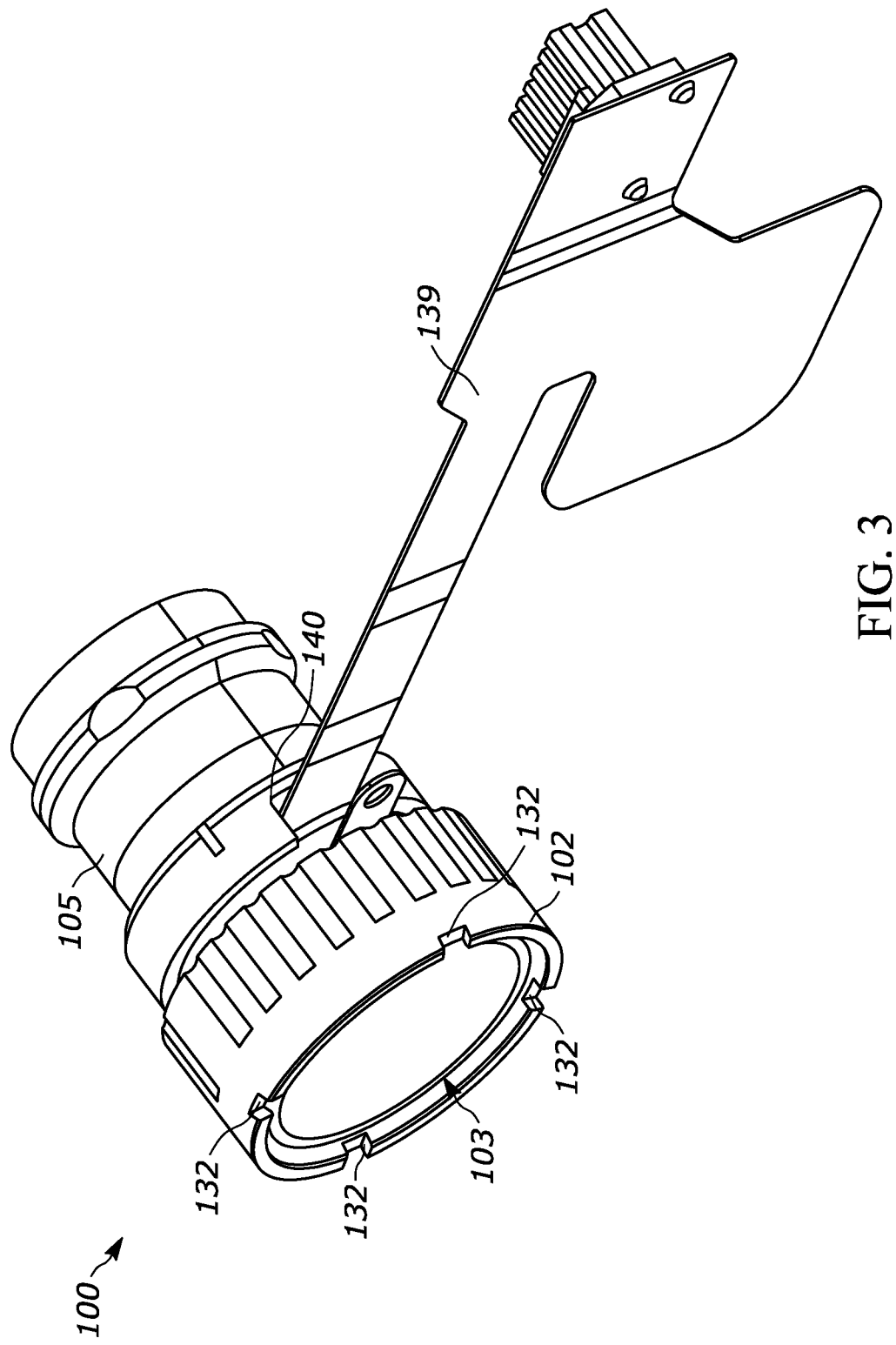
FIG. 3 illustrates an isometric view of the optical assembly of FIG. 1.

FIG. 3 illustrates an isometric view of the optical assembly 100 of FIG. 1. FIG. 3 illustrates the first and second lens holders 102, 105 coupled together and the cable 139 extending from one of the slots 140.

Figure 4:
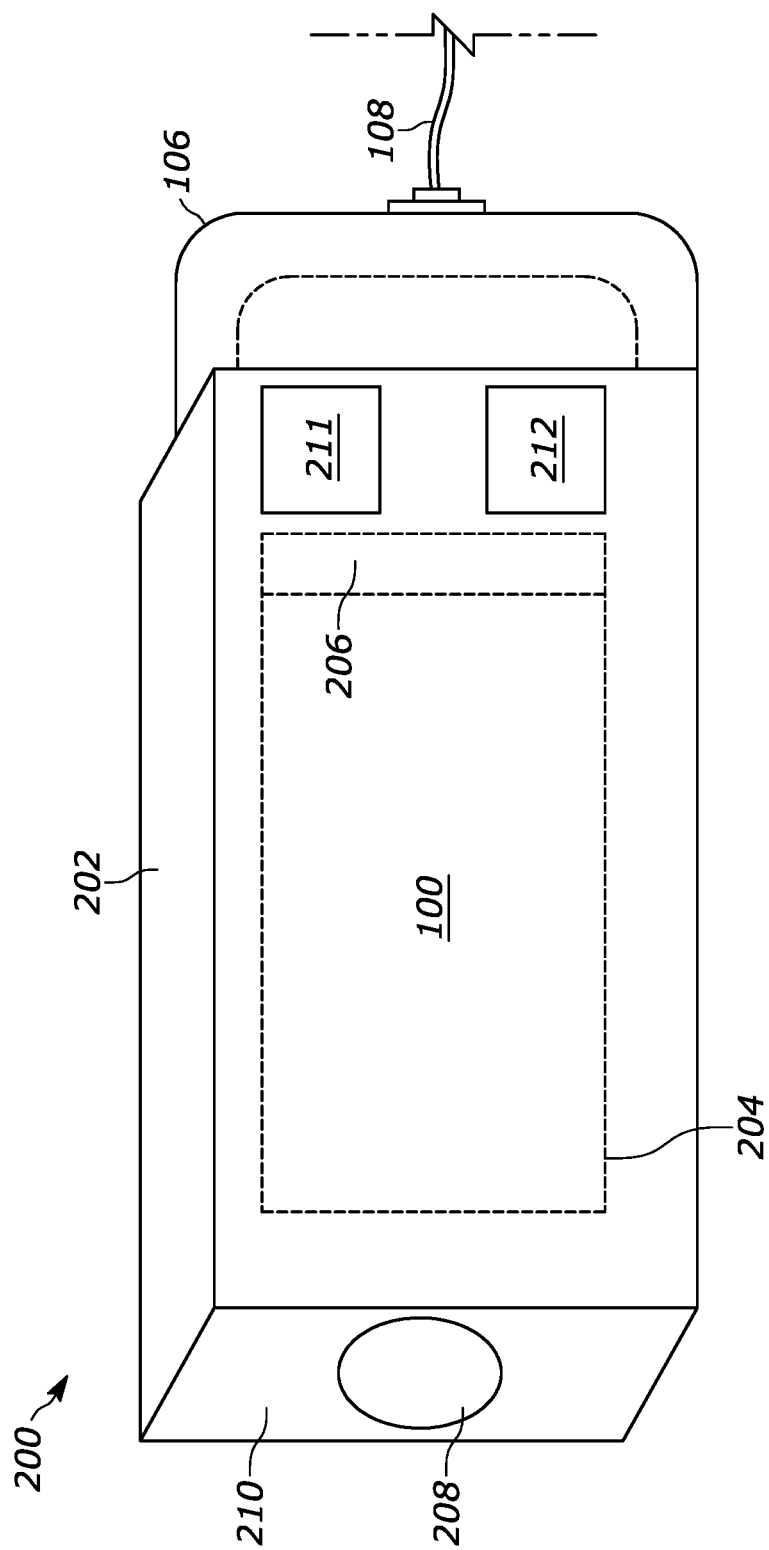
FIG. 4 illustrates a schematic representation of an imaging-based vision device that includes a housing and an imaging system at least partially disposed within the housing.

FIG. 4 illustrates a schematic representation of an imaging-based vision device 200 that includes a housing 202 and an imaging system 204 at least partially disposed within the housing 202 and including the optical assembly 100 and an image sensor 206. A front aperture 208 is disposed toward an end 210 of the housing 202 and the optical assembly 100 is disposed between the front aperture 208 and the image sensor 206. The front aperture 208 may block light from objects outside of the field of view to reduce imaging problems. Additionally, the front aperture 208 in conjunction with the lenses of the lens groups 103, 146, 148 allow the image to correctly form on the image sensor 206. The front aperture 208 may be defined by the housing 202 or may be a separately provided component.

In the example shown, the vision device 200 may include an onboard power supply 211 and a printed circuit board 212, including a controller and/or a memory that controls operation of the optical assembly 100 and/or the vision device 200. In some examples, the vision device 200 may include additional elements such as an illumination system configured to illuminate a target object for imaging. The illumination system may include a light emitting diode, a laser diode, a black body radiation source, or another illumination source and/or optics for dispersing or focusing optical radiation for illumination of the object. The illumination system may be housed inside of the housing 202, attached to an external surface(s) of the housing, or may be a separate device or component configured to illuminate the target object for capturing an image by the vision device 200. Other elements that may be included in the vision device 200 include, for example, decoding systems, processors, and/or circuitry coupled to the circuit board 212 to assist in the operation of the vision device 200 and/or a trigger that may be used to activate the optical assembly 100 to capture an image.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An optical assembly for imaging an object of interest, the optical assembly comprising:
   a first lens holder including a collar having an internal flange forming a spring seat;
   a first lens group disposed within the first lens holder along an optical axis and configured to receive light from an object of interest;
   a second lens holder comprising a collar defining a chamber and coupled to the collar of the first lens holder;
   a biasing element disposed within the chamber of the second lens holder; and
   a variable focus optical element disposed within the chamber of the second lens holder along the optical axis and configured to receive the light from the first lens group,
   wherein the biasing element is disposed between the spring seat and the variable focus optical element and configured to apply a threshold force to the variable focus optical element.

2. The optical assembly of claim 1, wherein the collar of the first lens holder has threads that threadably engage threads of the collar of the second lens holder.

3. The optical assembly of claim 2, wherein the threads of the first lens holder are internal threads and the threads of the second lens holder are external threads.

4. The optical assembly of claim 1, wherein the first lens holder comprises a stop that is engaged by an end of the collar of the second lens holder to define a relative position between the first lens holder and the second lens holder.

5. The optical assembly of claim 4, wherein the stop is defined by the internal flange of the first lens holder.

6. The optical assembly of claim 4, wherein the engagement between the stop and the end of the collar of the second lens holder defines a distance between the first lens group and the variable focus optical element.

7. The optical assembly of claim 4, wherein the engagement between the stop and the end of the collar of the second lens holder defines a distance between the spring seat and the variable focus optical element and causes the spring seat to compress the biasing element.

8. The optical assembly of claim 1, further comprising a flexible cable that wraps around the variable focus optical element and wherein the collar of the second lens holder defines a slot that receives the cable.

9. The optical assembly of claim 8, wherein an end of the collar of the second lens holder defines an opening of the slot.

10. The optical assembly of claim 8, wherein the slot is a pair of opposing slots defined by the collar of the second lens holder.

11. The optical assembly of claim 1, wherein the first lens holder has a second collar opposite the first collar that receives the first lens group.

12. The optical assembly of claim 11, wherein an end of the second collar defines a pair of opposing slots that are configured to receive a tool to facilitate rotating the first lens holder relative to the second lens holder.

13. The optical assembly of claim 1, wherein an exterior surface of the the first lens holder defines grooves.

14. The optical assembly of claim 1, wherein the biasing element comprises a wave spring.

15. The optical assembly of claim 1, further comprising a second lens group disposed within the second lens holder, along the optical axis, and configured to receive the light from the variable focus optical element.

16. The optical assembly of claim 15, wherein the second lens holder defines an aperture positioned between the variable focus optical element and the second lens group.

17. The optical assembly of claim 15, further comprising an aperture positioned between the variable focus optical element and the second lens group.

18. The optical assembly of claim 1, wherein the variable focus optical element is at least one of a liquid lens and a tunable lens.

19. The optical assembly of claim 1, wherein the first lens group includes a single lens and the second lens group includes a plurality of lenses.

20. An optical assembly for imaging an object of interest, the optical assembly comprising:
a first lens holder having internal threads;
a first lens group disposed within the first lens holder along an optical axis and configured to receive light from an object of interest;
a second lens holder having external threads that threadably engage the threads of the first lens holder;
a variable focus optical element disposed within the second lens holder along the optical axis and configured to receive the light from the first lens group; and
a biasing element disposed within the second lens holder and configured to apply a threshold force to the variable focus optical element.

21. The optical assembly of claim 20, further comprising a spacer disposed within the second lens holder and positioned between the variable focus optical element and the biasing element.

22. The optical assembly of claim 21, wherein the spacer has an inner surface that outwardly tapers toward the variable focus optical element to define an engagement surface at an end of the spacer.

* * * * *